United States Patent [19]  [11] 3,914,183
Johansson et al. [45] Oct. 21, 1975

[54] COMPOSITION IN BEAD FORM CONTAINING A WATER-INSOLUBLE POLYSACCHARIDE ACTIVATED BY CYANOGEN HALIDE, AND A PROCESS FOR THE PREPARATION OF SAME

[75] Inventors: Haldor Ingemar Johansson; Helga Katarina Lundgren; Marius Klaus Joustra, all of Uppsala, Sweden

[73] Assignee: Pharmacia Fine Chemicals AB, Uppsala, Sweden

[22] Filed: Apr. 3, 1973

[21] Appl. No.: 347,503

[30] Foreign Application Priority Data
Apr. 7, 1972 Sweden................................ 4508/72

[52] U.S. Cl. ..................... 252/184; 195/63; 195/68; 195/DIG. 11; 252/397; 252/399
[51] Int. Cl.² ............................................ C07G 7/02
[58] Field of Search ........... 252/182, 397, 399, 184; 195/63, 68, DIG. 11

[56] References Cited
UNITED STATES PATENTS
2,824,092  2/1958  Thompson.................. 195/DIG. 11

3,645,852  2/1972  Axen...................................... 195/68
3,791,928  2/1974  Rohde............................... 195/68 X FOREIGN PATENTS OR APPLICATIONS
2,133,370  11/1972  France................................ 195/63

OTHER PUBLICATIONS

R. Axen et al., "Binding of Proteins to Polysaccharides by Means of Cyanogen Halides," *Acta Chem. Scand.* 25 (7) pp. 2711–2716, 1971.

Primary Examiner—Dennis E. Talbert, Jr.
Assistant Examiner—Dennis L. Albrecht
Attorney, Agent, or Firm—Fred Philpitt

[57] ABSTRACT

A composition in bead form containing a water-insoluble cyanogen halide activated polysaccharide or a water-insoluble cyanogen halide activated derivative of a polysaccharide, said polysaccharide or derivative of polysaccharide being intended to be used as a matrix for coupling amino group-containing substances, for example, biological substances such as polypeptides and proteins, and a method of making such a composition.

11 Claims, No Drawings

COMPOSITION IN BEAD FORM CONTAINING A WATER-INSOLUBLE POLYSACCHARIDE ACTIVATED BY CYANOGEN HALIDE, AND A PROCESS FOR THE PREPARATION OF SAME

Agarose activated by cyanogen bromide is known to the art (vide Swedish Pat. No. 337,223). It is also known to couple different biological substances such as glucosoxidase to the thus activated agarose. In this connection, the reaction is carried out in two stages, an activation of the agarose with the cyanogen bromide being carried out in the first stage and a coupling of the glucosoxidase to the cyanogen bromide activated agarose being carried out in the second stage. There is a present need for cyanogen bromide activated agarose which does not immediately need to be subjected to the coupling process with the substance to be attached, but can be stored for a reasonable period of time and then used, without its activity having been reduced to an excessive extent and/or having lost its swellability in water.

According to the present invention, a composition in bead form comprising a water-insoluble cyanogen halide activated polysaccharide or a water-insoluble cyanogen halide activated derivative of polysaccharide, said polysaccharide or derivative of polsaccaride being intended to serve as a matrix for coupling amino group-containing substances, is characterized in that it also contains (1) a water-soluble acid capable of lowering the pH of an aqueous solution thereof below about 5, (2) at least one water-soluble polysaccharide and (3) 0 – 4 percent of water. In the composition, the cyanogen halide activated polysaccharide or derivative thereof is stabilized against decrease in its reactivity and loss of swellability when stored.

When using the composition for coupling purposes, the composition should be caused to swell in an aqueous liquid, the substances taken up in the gel structure of the water-insoluble cyanogen halide activated polysaccharide being leached out, whereafter coupling can take place.

According to the invention, the water-insoluble cyanogen halide activated polysaccharide may be cyanogen halide activated agarose or a cyanogen halide activated derivative of agarose. An example of such a derivative is cross-linked agarose, epichloro hydrin having been used as cross-linking agent.

According to the invention, the water insoluble cyanogen halide activated polysaccharide may be cyanogen halide activated cellulose or a cyanogen halide activated derivative of cellulose.

According to the invention the halogen substituent of the cyanogen halide can be bromo or chloro.

According to the invention the water-soluble polysaccharide may be a macromolecular polysaccharide such as dextran or an uncharged derivative of dextran.

According to the invention, the composition may contain a low molecular weight saccharide such as a monosaccharide or a disaccharide, lactose and glucose being examples of suitable saccharides.

The invention is also concerned with a process for the preparation of a composition in bead form as defined above. According to the invention swollen beads of the water-insoluble cyanogen halide activated polysaccharide or the water-insoluble cyanogen halide activated derivative of polysaccharide is added with the water-soluble polysaccharide or water-soluble derivative of polysaccharide and the acid to form a mixture after which the mixture is lyophilized to a water content in the range of from 0 to 4 percent by weight Optionally, the low molecular weight saccharide such as lactose or glucose is incorporated in the mixture before lyophilization.

The invention is of great importance, since it enables a matrix activated with cyanogen halide, preferably cyanogen bromide, to be sold which retains both its structure and its reactive groups for long periods of time. The fact that the aforedisclosed solution solves the problem on hand is surprising against the facts known to the art. According to literature on this particular subject, it is necessary to use the reactive groups within a very short period of time. The product according to the present invention retains the reactivity of the active groups in an aqueous solution for a period of time sufficient to enable the product to be worked up and the water removed therefrom. The product then retains its activity at a high level for a considerable period of time. One important feature of the invention is that the composition shall contain an acid and that the pH of the matrix activated with the cyanogen halide is rapidly lowered after the activation.

The water-insoluble polysaccharide provided with reactive groups by the activation process may be, as previously mentioned, a cross-linked polysaccharide. Examples of such include cross-linked agarose. The derivative may also be obtained by substitution with special groups, e.g., hydroxy propyl groups, such as is the case with hydroxy propyl cellulose.

The acids in the composition are those substances which are able to lower the pH of the composition in aqueous solution to below approx. 5, preferably below approx. 4, acids and organic acids such as for example mineral acids and water-soluble organic acids such as lower fatty acids, citric acid and lactic acid, etc. The acid and the quantity in which it is added are suitably selected so that the pH in diluted aqueous solution lies between approx. 2 and approx. 4.

The water content of the composition is important, inasmuch as an excessive water content results in an unstable product. The limit at which unstability of the composition occurs as a result of the presence of water can be set to approx. 4 %. The water content, however, should conveniently lie at least slightly below this limit, e.g., below approx. 3 %. Normal values which provide for good stability of the composition lie between 1 and 2 %.

A preferred composition according to the invention may contain the following ingredients in the following contents:

| | |
|---|---|
| Water-insoluble cyanogen halide activated polysaccharide (or derivatives) | 5—80% |
| water-soluble polysaccharide | 25—95% |
| low molecular weight saccharide, if present | 25—95% |
| water-soluble acid in a sufficient quantity to lower the pH of the composition after swelling in water to below 5 | |
| water | 0— 4% |

The invention will now be illustrated by some examples.

EXAMPLE 1

A 500 ml reaction vessel was provided with an agitator, a thermometer and a glass calomel electrode coupled to a pH meter. The apparatus was placed in a ventilated cupboard. 3.3 g of cyanogen bromide were dissolved with agitation in 300 ml of distilled water in the reaction vessel. 150 g of sedimented agarose were weighed up and washed on a nutsche with approx. 2 liters of distilled water.

The agarose was then introduced into the reaction vessel and 2N sodium hydroxide was then slowly added so that the pH rose to 11 whereupon the reaction began to take place. Sodium hydroxide was consumed in the reaction which took place at about room temperature. The consumed sodium hydroxide was compensated for by adding 2N sodium hydroxide to maintain the pH constant at 11. The supply of sodium hydroxide to the reaction vessel was stopped after 6 minutes. The reaction mixture was then transferred to a nutsche and washed with approx. 2 liters of cold, distilled water. The solution was finally washed with approx. 2 liters of 0.005 M citric acid. A solution containing 24 g of dextran having the average molecular weight 40,000 in 120 ml of 0.005 M citric acid had been prepared previously. The activated agarose washed with citric acid was then mixed with the solution of dextran while stirring for 1 hour. The mixture was then freeze-dried to 1 – 2 percent moisture content. Including the added substances, the yield was approx. 28 g. The reactivity of the finished product against protein was tested by coupling $\alpha$-chymotrypsinogen. In this way, 270 mg $\alpha$-chymotrypsinogen were coupled per gram of dry matrix. The storage ability of the activated product was tested by storing the same at 40°C for 4 weeks. After this period, it was found that the coupling ability of the substance to protein had decreased by 19 %.

EXAMPLE 2

This experiment was carried out in the same manner as example 1 with the exception that a solution containing 16.2 g of dextran having an average molecular weight of 40,000 and 16.2 g of lactose in 0.005 M citric acid was substituted for the solution containing only dextran.

The yield was about 34 g.

350 mg of $\alpha$-chymotrypsinogen was bound to the matrix by coupling per g of dry matrix. After storing at 40°C for 6 weeks, the coupling ability against protein was diminished by 15 percent.

EXAMPLE 3

This experiment was carried out in the same manner as example 1 with the exception that 0.001 M hydrochloric acid was substituted for the citric acid. The yield was about 32 g.

304 mg of $\alpha$-chymotrypsinogen were bound by coupling to the matrix per g of the dry matrix. After storing at 40°C for 4 weeks, the coupling ability against protein had diminished by 14 percent.

EXAMPLE 4

This experiment was carried out in the same manner as example 1 with the exception that 0.005 M lactic acid was substituted for the citric acid. The yield was about 33 g.

287 mg of $\alpha$-chymotrypsinogen were bound by coupling to the matrix per gram of the dry matrix. After storing at 40°C for 4 weeks, the coupling ability against protein had diminished by 10 percent.

EXAMPLE 5

This experiment was carried out in the same manner as example 2, with the exception that a solution containing 16.2 g of dextran having an average molecular weight of 40,000 and 16.2 g of glucose was substituted for the solution containing only the dextran.

The yield was about 34 g.

224 mg of $\alpha$-chymotrypsinogen was bound by coupling to the matrix, calculated per gram of the dry matrix. After storing at 40°C for 4 weeks, the coupling ability against protein had diminished by 21 percent.

EXAMPLE 6

This experiment was carried out in the same manner as example 2, with the exception that 150 g of sedimented beads of agarose cross-linked by epichlorohydrin having a dry substance content of 4 percent was used as a water-insoluble cyanogen halide activated derivative of carbohydrate.

The yield was about 32 g.

83 mg of $\alpha$-chymotrypsinogen were bound to the matrix by coupling, calculated on the dry matrix. After storing at 40°C for 4 weeks, the coupling ability had diminished by 24 percent.

What we claim is:

1. A composition in bead form containing
   a. 5 – 80% of a water-insoluble cyanogen halide activated polysaccharide or a water-insoluble cyanogen halide activated derivative of polysaccharide, said polysaccharide or derivative of polysaccharide being intended to serve as a matrix for coupling amino group-containing substances and said cyanogen halide being a halide other than a fluoride,
   b. a water-soluble acid in a quantity sufficient to lower the pH of an aqueous solution thereof to a value in the range of from 5 to approximately 2,
   c. 25 – 95% of at least one water-soluble polysaccharide, and
   d. 0 – 4% of water said cyanogen halide activated polysaccharide or derivative thereof being stabilized against decrease in its reactivity and loss of its swellability when stored.

2. A composition as claimed in claim 1, wherein the water-insoluble cyanogen halide activated polysaccharide is cyanogen halide activated agarose or a cyanogen halide activated derivative of agarose.

3. A composition as claimed in claim 1, wherein the cyanogen halide activated water-insoluble polysaccharide is cyanogen halide activated cellulose or a cyanogen halide activated derivative of cellulose.

4. A composition as claimed in claim 1, wherein the halogen substituent of the cyanogen halide is bromo or chloro.

5. A composition as claimed in claim 1, wherein the water-soluble polysaccharide is a macromolecular polysaccharide.

6. A composition as claimed in claim 5, wherein the macromolecular polysaccharide is dextran or an uncharged derivative of dextran or an uncharged derivative of cellulose.

7. A composition as claimed in claim 1, which includes 25 – 95% of a low molecular weight saccharide.

8. A composition as claimed in claim 7, wherein the low molecular weight saccharide is a monosaccharide or disaccharide.

9. A composition as claimed in claim 8, wherein the low molecular weight saccharide is lactose.

10. A process for the preparation of a composition in bead form containing 5 – 80% of a water-insoluble cyanogen halide activated polysaccharide or a water-insoluble cyanogen halide activated derivative of a polysaccharide, said polysaccharide or derivative of polysaccharide being intended to serve as a matrix for coupling amino group-containing substances, said cyanogen halide being a halide other than a flouride, a water-soluble acid in a quantity sufficient to lower the pH of an aqueous solution thereof to a value in the range of from 5 to approximately 2, 25 – 95% of at least one water-soluble polysaccharide and 0 – 4% of water, said percentages being calculated on the total weight of the composition, said cyanogen halide activated polysaccharide or cyanogen halide activated derivative of polysaccharide being stabilized against decrease in reactivity and loss of its swellability when stored, characterized in that swollen beads of the water-insoluble cyanogen halide activated polysaccharide or the water-insoluble cyanogen halide activated derivative of polysaccharide is added with the water-soluble polysaccharide or water-soluble derivative of polysaccharide and the acid to form a mixture and in that the mixture is lyophilized to a water content in the range of from 0 – 4% by weight.

11. A process as claimed in claim 10, wherein a low molecular weight saccharide is added in forming the mixture.

* * * * *